United States Patent [19]

Shah

[11] Patent Number: 5,482,669
[45] Date of Patent: Jan. 9, 1996

[54] PULSATING GAS-ASSISTED INJECTION MOLDING METHOD AND APPARATUS

[75] Inventor: Suresh D. Shah, Troy, Mich.

[73] Assignee: General Motors Corporation, Detroit, Mich.

[21] Appl. No.: 247,375

[22] Filed: May 23, 1994

[51] Int. Cl.$^6$ .......................... B29C 44/02; B29C 45/00
[52] U.S. Cl. ....................... 264/572; 264/40.3; 425/130
[58] Field of Search .................................. 264/572, 40.3, 264/513, 328.8, 328.12, 328.13; 425/130, 522

[56] References Cited

U.S. PATENT DOCUMENTS

| | | | |
|---|---|---|---|
| 4,106,887 | 8/1978 | Yasuike et al. | 425/549 |
| 5,028,377 | 7/1991 | Hendry | 264/572 |
| 5,098,637 | 3/1992 | Hendry | 264/572 |
| 5,135,703 | 8/1992 | Hunerberg et al. | 264/572 |
| 5,198,238 | 3/1993 | Baxi | 425/130 |
| 5,204,050 | 4/1993 | Loren | 264/572 |
| 5,204,051 | 4/1993 | Jaroschek | 264/572 |
| 5,295,800 | 3/1994 | Nelson et al. | 264/572 |

*Primary Examiner*—Catherine Timm
*Attorney, Agent, or Firm*—George A. Grove

[57] ABSTRACT

Method and apparatus for pulsating gas-assisted injection molding hollow tubular plastic parts includes the injection of a molten plastic into a mold cavity in an amount less than the cavity volume and in separate molten plastic flows that flow along the cavity and ultimately unite in a solidifying fusion welding state at an interface. A pressurized gas is injected into the molten plastic to form a central void in the molten plastic extending to opposite sides of the interface leaving a voidless solidifying fusion weld section encompassing the interface. The gas pressure acting on the opposite sides of the interface is trapped and then alternately increased and decreased by a separate gas injection that creates gas pulsations that effect shifting of the molten weld section in opposite directions to force intermingling of the plastic molecules therein and across the interface to enhance the strength of the fusion weld section on solidification and eliminate appearance knit lines. Reinforcement fibers may be included in the molten plastic and the shifting of the molten weld section orients a number of the reinforcement fibers generally parallel to each other and transverse to and extending across the interface to thereby enhance fusion weld section strength.

3 Claims, 3 Drawing Sheets

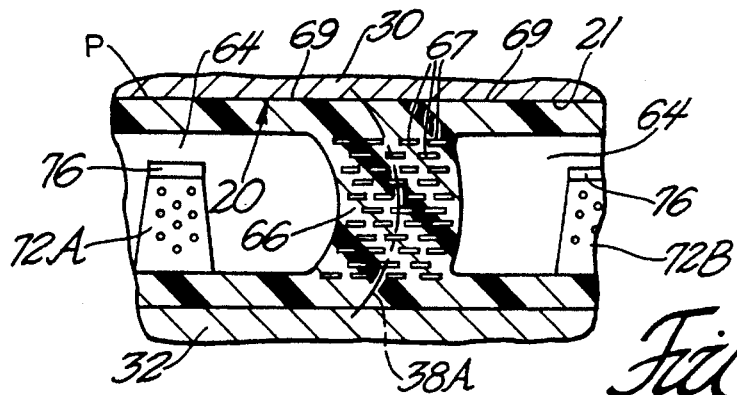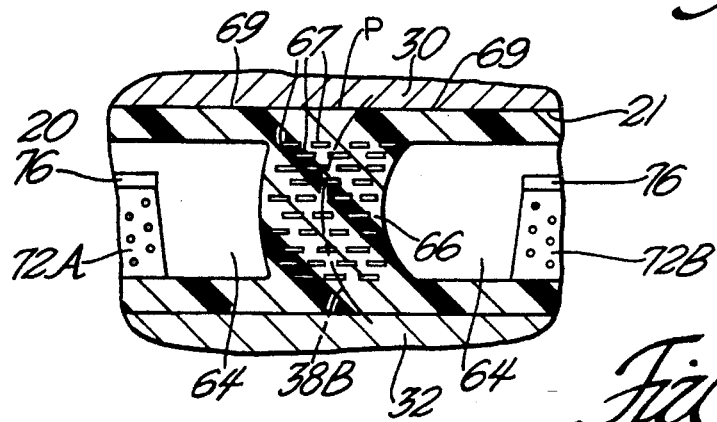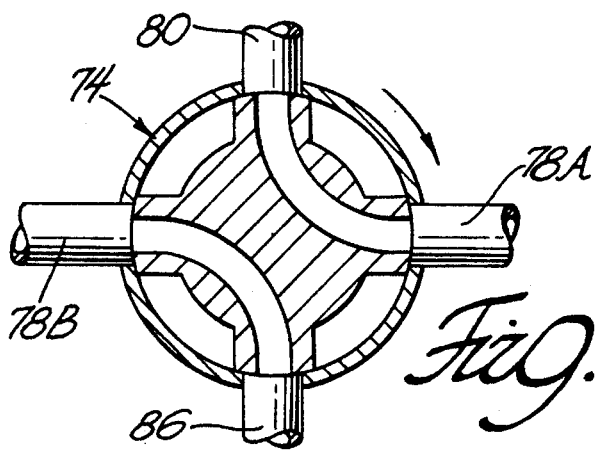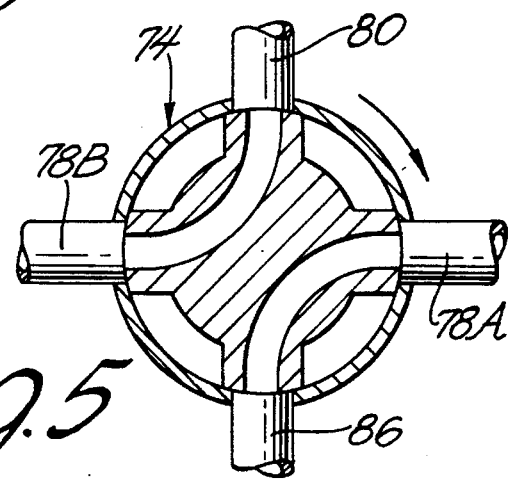

PULSATING GAS-ASSISTED INJECTION MOLDING METHOD AND APPARATUS

FIELD OF THE INVENTION

This invention relates to gas-assisted injection molding of hollow tubular plastic parts and more particularly to the juncture of molten plastic flows in the formation of the parts.

BACKGROUND OF THE INVENTION

In gas-assisted injection molding of hollow tubular plastic parts, there are basically two types of processes, namely, gas through the injection nozzle and gas through a runner or the mold cavity. In both processes, the molten plastic separates into two flows in the mold cavity that ultimately join together at some point along the cavity where they start fusing together at their interface or weld line. The amount of molten plastic injected is a prescribed amount less than the volume of the mold cavity as determined by the desired wall thickness and is commonly referred to as a "short shot". A prescribed amount of inert gas under pressure is either simultaneously or subsequently introduced into the center of the molten plastic. The combination of high melt surface tension of the molten plastic at the cavity surface and the lower viscosity of the inwardly located hotter molten plastic confines the gas to form a hollow in the latter region. The molten plastic that is displaced by the gas is pushed into the extremities of the mold cavity, packing out the mold part and forming a void extending to opposite sides of the interface where the two plastic flows have joined and are fusing together to eventually form a solid weld section. The gas pressure is then normally maintained or held while the plastic proceeds to cure to form the finished part. Examples of such methods and apparatus are disclosed in U.S. Pat. Nos. 4,106,887, 5,098,637, 5,028,377, 5,204,051 and 5,198,238 and U.S. Ser. No. 07/955,767, filed Oct. 2, 1992 and assigned to the assignee of this invention.

As compared to conventional injection molding, the gas assist offers the advantages of no molded-in stresses, lower tool cost, reduced clamping forces, significant reduction in sink marks and improved surface finish. However, the strength of the weld line is relatively weak because of the high viscosity of the plastic melt at the front of the flows and because of the lack of interaction of the plastic molecules at the resulting stationary interface where the two molten plastic flow fronts meet. As a result, there is little, if any, polymer molecule mechanical entanglement or poor alignment of reinforcing fibers. Accordingly, there is optimum reinforcing fiber orientation in a melt/solid weld section encompassing the weld line that could enhance the weld strength. Thus, the molded hollow tubular part is inclined to breakage at the weld section.

SUMMARY OF THE INVENTION

The present invention resulted from the recognition that if the plastic region encompassing the interface and while still in a molten state could somehow be made to shift back and forth, this shifting could re-orient the plastic molecules in an entangled manner at the interface effectively eliminating the weld line. There is, however, no direct hydraulic plastic melt communication with the center as well as the perimeter of the weld section as with a solid plastic part. But it was discovered that the effect thereof could be accomplish by pushing and pulling on these melt fronts at their interface with differential pressure immediately after the gas injection stage and while the gas pressure is in its holding stage as the plastic cures in the mold.

The apparatus for accomplishing this push/pull or shifting movement comprises a pair of nozzles or gas pins that project into the mold cavity on opposite sides of where the voidless plastic weld region occurs. The nozzles are closed at their end and have adjacent miniature transverse holes that face into the hollow of the plastic melt that develops during the normal gas injection stage. At the end of the latter stage and while the gas pressure is maintained for a brief interval, the nozzles are rapidly alternately connected to receive the same gas but at a higher pressure and to exhaust or vent the gas pressure. This creates a rapidly reversing or pulsating pressure differential acting on the melt/solid weld section, causing the plastic melt at the interface to shift in opposite directions. The amplitude and frequency of the plastic melt shift at the interface is controlled by the magnitude and rate of the pulsating gas pressure so as to cause considerable mechanical entanglement of the polymer molecules at the interface that effectively eliminates weld line defects. When the injected plastic includes reinforcement fibers, this back and forth shifting action at the melt/solid interface also creates a shearing action that acts to align the fibers in parallel relationship transverse to and across the interface to further improve the strength of the fusion weld joint.

It is, therefore, an object of the present invention to provide a new and improved gas-assisted injection molding method and apparatus for molding hollow tubular plastic parts.

Another object is to provide a pulsating gas-assisted injection molding method and apparatus for molding hollow tubular plastic parts.

Another object is to provide a pulsating gas-assisted injection molding method and apparatus for molding hollow tubular plastic parts in an efficient cost effective manner.

Another object is to provide a pulsating gas-assisted injection molding method and apparatus for molding hollow tubular plastic parts wherein voidless molten plastic fronts where they join at an interface ahead of the hollow sections of the part are repeatedly shifted by alternating differential gas pressure to cause mechanical entanglement of their polymer molecules for enhanced strength at the interface.

Another object is to provide a pulsating gas-assisted injection molding method and apparatus for molding hollow tubular plastic parts wherein voidless molten plastic fronts where they join at an interface ahead of the hollow section of the part are repeatedly shifted at their juncture by alternating differential gas pressure at controlled frequencies and amplitudes to cause mechanical entanglement of their polymer molecules for enhanced strength at the interface.

Another object is to provide a pulsating gas-assisted injection molding method and apparatus for molding hollow tubular plastic parts with molten plastic containing reinforcement fibers wherein voidless molten plastic fronts where they join at an interface ahead of the hollow section of the part are repeatedly shifted at their juncture by alternating differential gas pressure at controlled frequencies and amplitudes to cause mechanical entanglement of their polymer molecules and strategic orientation of the fibers for enhanced strength at the interface.

Another object is to provide a pulsating gas-assisted injection molding apparatus for molding hollow tubular plastic parts wherein the apparatus has two nozzles that alternately deliver gas pressure and vent opposite sides of two molten plastic fronts where they join at an interface ahead of the hollow section of the part to thereby cause a pressure differential that acts to repeatedly shift the two plastic melt fronts back and forth so as to cause mechanical entanglement of their polymer molecules for enhanced strength at the interface.

Another object is to provide a pulsating gas-assisted injection molding apparatus for molding hollow tubular plastic parts with a molten plastic containing reinforcement fibers wherein the apparatus has two nozzles that alternately deliver gas pressure and vent opposite sides of two molten plastic fronts where they join at an interface ahead of the hollow section of the part to thereby cause a pressure differential that acts to repeatedly shift the plastic melt fronts back and forth so as to cause mechanical entanglement of their polymer molecules and reorientation of the fibers for enhanced strength at the interface.

These and other objects, advantages and features of the invention will become more apparent from the following detailed description of the preferred embodiment and accompanying drawings wherein:

BRIEF DESCRIPTION OF THE DRAWINGS

FIG. 4 is an enlarged view taken along the line 4—4 in FIG. 2 looking in the direction of the arrows;

FIG. 5 is a view similar to FIG. 4 but showing the rotary valve in different position;

FIG. 6 is a view similar to FIG. 3 but showing the weld section displaced in one direction by a differential gas pulsation; and FIG. 7 is a view similar to FIG. 4 but showing the weld section pulsed in the opposite direction.

DETAILED DESCRIPTION OF THE DRAWINGS

Figure 1:
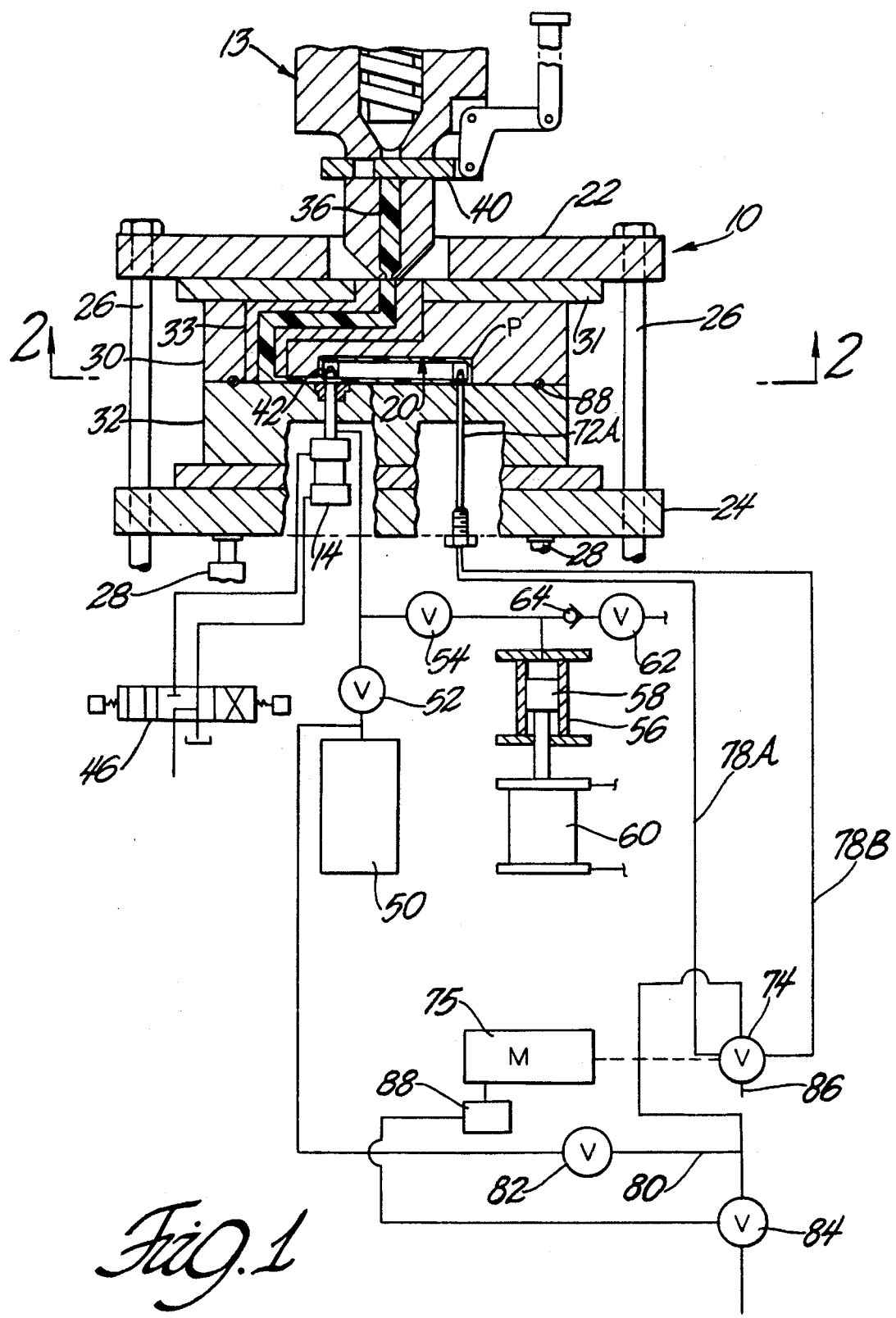
FIG. 1 is a diagrammatic view with parts in section of apparatus according to the present invention.
Figure 2:
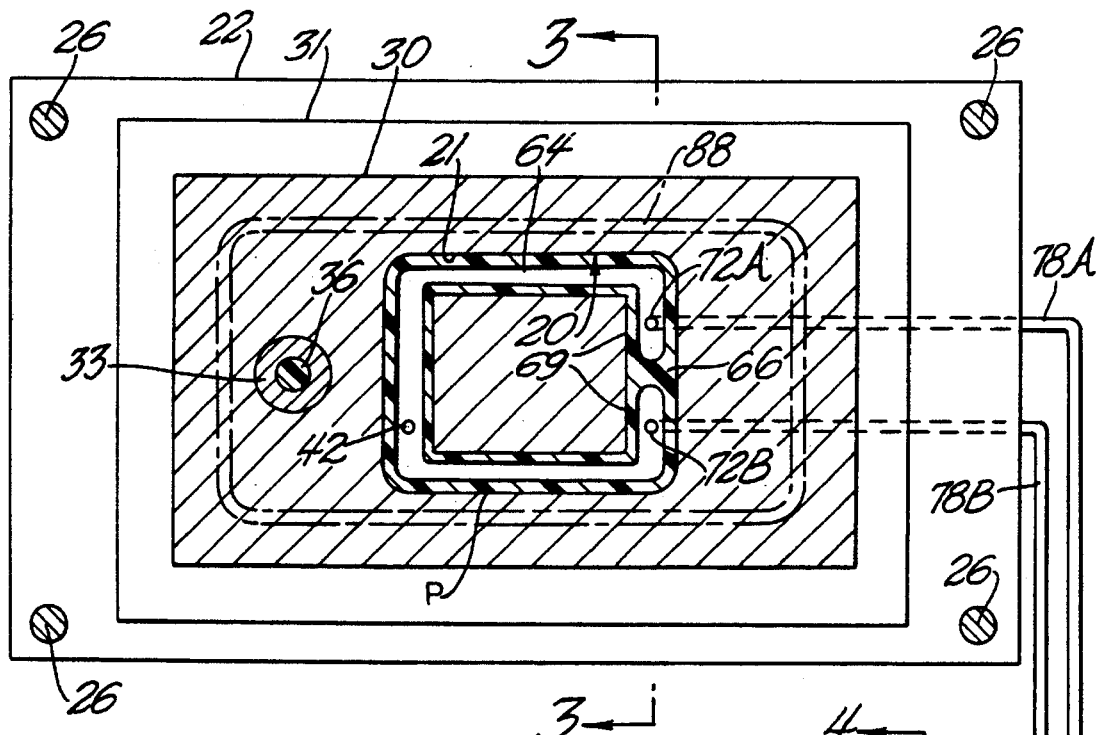
FIG. 2 is a view taken on the line 2—2 in FIG. 1 looking in the direction of the arrows.

There is illustrated in FIGS. 1 and 2 a pulsating gas-assisted injection molding apparatus 10 for molding hollow tubular plastic parts. The apparatus comprises a plastic injector unit 12, a primary gas injector unit 14 and a positioning and clamp assembly 16 for holding a two-part mold 18, the latter having a cavity 20 whose surface 21 defines the outer surface of the hollow tubular part P to be molded. The mold cavity and the tubular part it defines are illustrated as having a rectangular shaped tubular circuit and a square cross section outline, but it will be understood that either or both could be of widely different configuration and change along the length and include ribs, bosses, etc.

The positioning and clamp assembly 16 comprises an upper stationary plate 22, a vertically movable lower plate 24 guided on four pins 26 with respect to the upper plate and a pair of hydraulic cylinders 28 for moving and holding the latter plate. The mold 18 has an upper mold half 30 fixed to a backing plate 31 on the upper plate 22 and a lower mold half 32 that is fixed to the lower plate 24 and is moved with respect to the stationary upper mold half 30 by the cylinders 28 to open and close the mold.

The injector unit 12 is mounted on the upper plate 22 and is operable to heat and bring a plastic material to a viscous state within a prescribed temperature and density range and to homogenize the material into a plastic melt 36. The unit 12 then injects a prescribed amount of this melt as a so-called short shot through a hot or cold runner manifold 33 in the upper mold half 30 and into the mold cavity 20 under a high pressure, e.g., 6,000 to 15,000 psi. The short shot is less than the volume of the mold cavity and is determined by the wall thickness desired in the molded part and may, for example, be about 70 percent of the mold cavity exclusive of runners. The melt on entering the mold cavity separates into two flows that ultimately join together at their respective front at some point along the length of the circuitous mold cavity and immediately start fusing together in a melt/solid state at their interface 38 as depicted in FIG. 2. The point where the molten plastic fronts join in the mold cavity will remain at essentially the same location in the repeated plastic injection and formation of pans and can be found by simply examining a finished molded pan. It is typical to have this wall section at this joining area.

The gas injector unit 14, which can be volume or pressure controlled, operates to inject an inert gas such as nitrogen through the mold and into the center of the plastic melt. This can occur simultaneously with the plastic injection and/or subsequently after some delay time or when the plastic flow is completely stopped by a shut-off nozzle 40. The gas injector unit comprises a nozzle 42 that is moved by a pneumatic cylinder 44 under the control of a valve 46 from a retracted position just below the mold surface 21, as shown, to an injecting position in the mold cavity as shown in phantom line in FIG. 1. In the latter position, the tip of the nozzle is located inwardly of the mold surface 21 toward the center of the mold cavity at a point along its length.

The inert gas is stored in a pressure vessel 50 and delivered by two valves 52 and 54 to a gas metering unit 56 on a retraction stoke of its piston 58 by a hydraulic ram 60. The pressure of the gas delivered to the gas metering device is regulated by a regulator valve 62 operating through a one-way valve 64, and the displacement with the retraction stroke measures the desired amount of gas to be delivered under stroke control of the ram 60. The gas is regulated at a pressure that is substantially lower than the plastic injection pressure and may, for example, be 200 to 2000 psi. The valve 52 to the gas supply is closed while the other valve 54 in this circuit remains open and the ram 60 is operated to displace the measured amount of gas into the center of the plastic melt through the nozzle 42.

Figure 3:
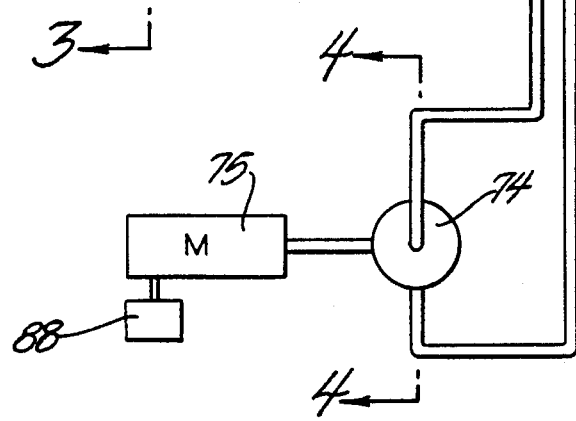
FIG. 3 is an enlarged view taken along the line 3—3 in FIG. 2.
Figure 3:
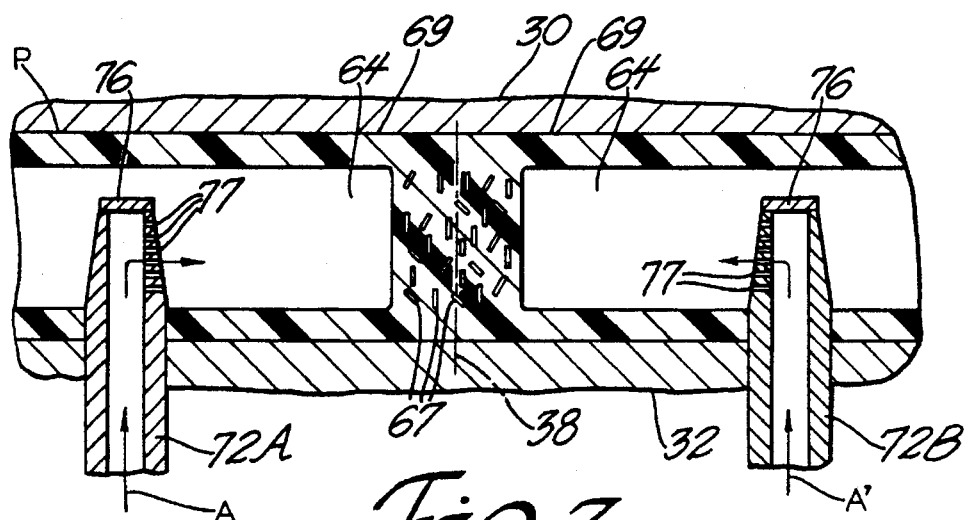

The combination of high melt surface tension at the mold surface 21 and the lower viscosity of the hotter molten plastic in the center confines the gas to form a hollow center 64 in the plastic melt. The molten plastic displaced by the gas is pushed into the extremities of the mold cavity packing out the molded part P and extending the hollow center to points adjacent and at opposite sides of the melt/solid interface 38. This operation takes only a very short time, e.g., one second, and there is resultantly formed a voidless fusing weld section 66 encompassing the interface 38 where the two plastic melt fronts have joined as illustrated in FIGS. 2 and 3.

The components of the apparatus thus far described are conventional and are controlled in a conventional gas-assisted injection molding manner. As such, the molding of the hollow tubular part would normally result in a weak weld line at the interface 38 as there is little, if any, mechanical entanglement of the plastic polymer molecules without further action if this fusion welding section remains stationary. Moreover, if reinforcement fibers 67 are contained in the plastic melt to increase the strength of the part, they will be in random array as depicted in FIG. 3 and there will be no possible alignment thereof traversing the interface to help strengthen the potentially weakest section.

The present invention effectively eliminates the formation of a weak weld line at the interface 38 and raises the strength of the solid weld section 66 to a level equal to or above that of the adjoining tubular plastic sections 69 by the addition of gas pulsating apparatus generally indicated as 70. The gas pulsating apparatus comprises a pair of gas nozzles 72A and 72B that are mounted in the lower mold half 32 and a four-way rotary valve 74 that is selectively driven by a variable speed motor 75 and alternately communicates these nozzles with the inert gas pressure supply but at a higher pressure and then vents these nozzles. The nozzles 72A and 72B are located adjacent to and on opposite sides of where the plastic weld section 66 forms during the above-described gas injection stage, and each has a tip 76 that extends into the hollow center 64 of the plastic melt. The end of the tip 76 is closed. Adjacent the closed end there is provided a plurality of small transverse holes 77 of, for example, 0.007 inch diameter that face into the hollow of the plastic melt. Preferably, the holes 77 in both nozzles are directed to the knit or interface area 38 so that the force of gas is directed to opposite sides of the knit area as shown by gas flow arrows A and A' to optimize formation of this weld or knit section. The nozzles 72A and 72B are connected by pneumatic lines 78A and 78B, respectively, to the rotary valve 74 which in turn is connected by a pneumatic line 80 and valve 82 to the gas pressure supply 50. A variable pressure regulator valve 84 regulates the pressure in line 80 to a pressure substantially above that being used in the gas injection stage, for example 25 percent higher.

The communicating positions of the rotary valve 74 are illustrated in FIGS. 4 and 5. In FIG. 4, the valve is shown communicating the nozzle 72A with the gas pressure in line 80 while communicating the other nozzle 72B with a venting low pressure recovery line 86. Then on 90 degrees clockwise rotation as illustrated in FIG. 5, the above connections are reversed with the nozzle 72A then vented and the other nozzle 72B connected to the gas pressure supply and with this sequence of events thus being repeated twice each valve rotation and the valve being operable to close off all these communications at positions intermediate each of the communicating positions. To prevent the escape of gas from the mold, an O-ring 88 is mounted in grooves in the interfaces of the mold halves 30 and 32 outboard of the mold cavity 20.

Describing now the operation of the gas pulsating apparatus 70, the rotary valve 74 is initially placed in a completely closed position intermediate any of its communicating positions while gas is being injected by the normal gas injector unit to hollow out the part as described previously. Following this gas injection stage which may take only one second, the gas pressure is then held for an additional short time such as another second while the rotary valve 74 is then turned by the motor 80. The turning rotary valve alternately delivers the higher gas pressure to the nozzles and vents same and thereby produces a pressure differential at one instant of time acting on the melt/solid weld section 66, causing it to shift in varying degrees in the direction of lower pressure as illustrated by the phantom line 38A in FIG. 6 with the shift increasing in magnitude toward the center of the mold cavity where the plastic melt is hottest. Then, on continuing valve rotation, this pressure differential is caused to reverse and resultantly shifts the plastic melt at the interface in the opposite direction as illustrated by the phantom line 38B in FIG. 7.

The amplitude and frequency of this shifting is controlled by the magnitude of the pulsating gas pressure and the speed of the rotary valve such as with a microprocessor 88 so as to effect a mechanical entanglement of the polymer molecules at the interface that effectively eliminates any weld line and the accompanying defects associated therewith. When the injected plastic includes the reinforcement fibers 67 as depicted in FIGS. 6 and 7, this back and forth shifting action at the melt/solid interface also creates a shearing action that acts to align a large number of the fibers in parallel relationship transverse to and across the interface as illustrated to further improve the strength of the fusion weld joint. At the conclusion of the gas pulsations, the weld section 66 assumes the initial configuration illustrated in FIG. 3 but with the polymer molecules entangled, the weld line 38 effectively eliminated in the weld section 66 and the fibers 67 in the weld section aligned parallel to each other and the tubular molded part P for maximum strength.

Obviously, numerous modifications and variations of the invention are possible in light of the above teachings. It is therefore to be understood that within the scope of the appended claims, the invention may be practiced otherwise than as specifically described herein.

The embodiments of the invention in which an exclusive property or privilege is claimed are defined as follows:

1. A method of pulsating gas-assisted injection molding a hollow tubular plastic part comprising the steps of:

injecting a molten plastic into a mold cavity in an amount less than the volume of the mold cavity and in separate molten plastic flows that flow along the mold cavity and ultimately join together in a solidifying fusion welding phase at an interface, injecting a gas under pressure into the center of the molten plastic in an amount to form a central void in the molten plastic extending to opposite sides of the interface and leaving a voidless solidifying fusion weld section encompassing the interface, and alternately venting and injecting additional gas but at a higher pressure at opposite sides of the weld section to effect shifting thereof in opposite directions to force intermingling of the plastic molecules therein and across the interface to thereby enhance the strength of the fusion weld section on solidification.

2. The method set forth in claim 1 wherein the molten plastic includes reinforcement fibers, and the shifting of the weld section orients a number of the reinforcement fibers generally parallel to each other and transverse to and extending across the interface to thereby further enhance the strength of the fusion weld section on solidification.

3. The method set forth in claim 1 wherein the pressure of the gas that is added is varied and the timing of the venting and gas addition is varied to obtain a desired intermingling of the plastic molecules.

* * * * *